(12) United States Patent
Ohta et al.

(10) Patent No.: US 7,949,535 B2
(45) Date of Patent: May 24, 2011

(54) USER AUTHENTICATION SYSTEM, FRAUDULENT USER DETERMINATION METHOD AND COMPUTER PROGRAM PRODUCT

(75) Inventors: Toshiyuki Ohta, Fukuoka (JP); Maiko Hirahara, Fukuoka (JP); Kazunari Hirakawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 11/492,975

(22) Filed: Jul. 26, 2006

(65) Prior Publication Data

US 2007/0266154 A1 Nov. 15, 2007

(30) Foreign Application Priority Data

Mar. 29, 2006 (JP) .................................. 2006-092545

(51) Int. Cl.
 G06F 17/21 (2006.01)
 G10L 19/00 (2006.01)
 G10L 21/00 (2006.01)
 H04M 11/00 (2006.01)
(52) U.S. Cl. ...................... 704/273; 379/93.03; 704/200; 704/220
(58) Field of Classification Search ............... 379/93.03; 704/273
 See application file for complete search history.

(56) References Cited

U.S. PATENT DOCUMENTS

| 5,101,434 | A | * | 3/1992 | King .............................. 704/241 |
| 5,450,490 | A | * | 9/1995 | Jensen et al. .................. 380/253 |
| 5,623,539 | A | * | 4/1997 | Bassenyemukasa et al. ........................... 379/88.02 |
| 5,727,072 | A | * | 3/1998 | Raman .......................... 381/94.2 |
| 5,734,715 | A | * | 3/1998 | Scalart et al. ............. 379/406.08 |
| 5,805,674 | A | * | 9/1998 | Anderson, Jr. .............. 379/93.03 |
| 5,956,463 | A | * | 9/1999 | Patrick et al. .................. 704/232 |
| 6,119,084 | A | * | 9/2000 | Roberts et al. ................ 704/246 |
| 7,233,898 | B2 | * | 6/2007 | Byrnes et al. .................. 704/246 |
| 2005/0060153 | A1 | * | 3/2005 | Gable et al. .................... 704/246 |
| 2005/0187765 | A1 | * | 8/2005 | Kim et al. ...................... 704/233 |
| 2006/0111912 | A1 | * | 5/2006 | Christian et al. .............. 704/273 |

FOREIGN PATENT DOCUMENTS

| JP | 5-323990 | 12/1993 |
| JP | 9-127974 | 5/1997 |
| JP | 2001-109494 A | 4/2001 |

* cited by examiner

Primary Examiner — Justin W Rider
(74) Attorney, Agent, or Firm — Murphy & King, PC (57) ABSTRACT

A system and method is provided for easily detecting a fraudulent user who attempts to obtain authentication using voice reproduced by a reproducer. A personal computer is provided with an audio data obtaining portion for picking up ambient sound around a person as a target of user authentication using voice authentication technology during a period before the person utters, and a fraud determination portion for calculating an intensity level showing intensity of the picked-up ambient sound per predetermined time for each of sections into which the period is divided and for determining that the person is a fraudulent user who attempts to obtain authentication using reproduced voice, when, of two of the calculated intensity levels, the intensity level of the later section is larger than a sum of the intensity level of the earlier section and a predetermined value.

6 Claims, 9 Drawing Sheets

USER AUTHENTICATION SYSTEM, FRAUDULENT USER DETERMINATION METHOD AND COMPUTER PROGRAM PRODUCT

BACKGROUND OF THE INVENTION

1. Field of the Invention

The present invention relates to a system, a method and others for detecting a user who attempts to fraudulently obtain user authentication of voice authentication technology.

2. Description of the Prior Art

Figure 9:
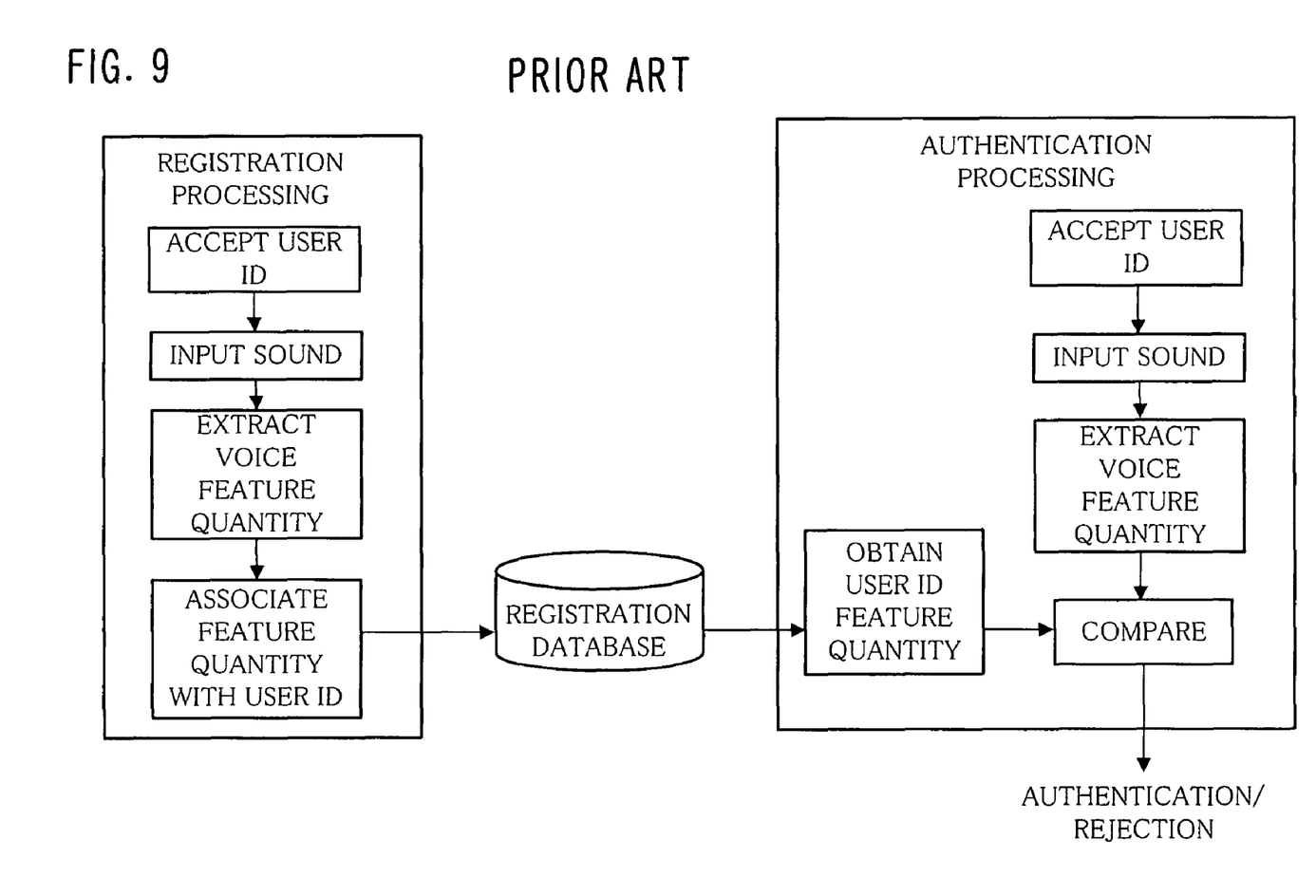
FIG. 9 is an explanatory diagram of a mechanism of a conventional authentication device using voice authentication technology.

FIG. 9 is an explanatory diagram of a mechanism of a conventional authentication device using voice authentication technology.

The emphasis has recently been on security measures in computer systems. In line with this trend, attention has recently been focused on biometrics authentication technology using physical characteristics. Among the biometrics authentication technology is voice authentication technology that uses differences of individual voice characteristics to identify/authenticate users. A conventional authentication device using such technology has the mechanism shown in FIG. 9.

Registration processing of feature quantity data showing feature quantity of voice for each user is performed in advance according to the following procedure. A user ID of a user to be registered is accepted and the user's real voice is captured. Feature quantity is extracted from the real voice and feature quantity data for the feature quantity are registered in a database in association with the user ID.

When a user authentication process is performed, a user ID of a user to be subject to the user authentication process is accepted and the user's real voice is captured to extract feature quantity of the real voice. The extracted feature quantity is compared with feature quantity indicated in feature quantity data corresponding to the user ID. In the case where the difference therebetween falls within a predetermined range, the user is authenticated. Otherwise, the user is determined to be a different person.

While various known technology is proposed as a comparison method of feature quantity, a text-dependent method and a free word method are typical methods. The text-dependent method is a method of comparing feature quantity by letting a user utter a predetermined phrase, i.e., a keyword. The free word method is a method of comparing feature quantity by letting a user utter a free phrase.

The voice authentication technology is convenient for users compared to conventional methods in which users operate keyboards to enter passwords. However, user authentication might be fraudulently attempted by recording voice surreptitiously with a recorder such as a cassette recorder or an IC recorder and reproducing the recorded voice with a reproducer. In short, the possibility arises of frauds called "identity theft/impersonation" or the like.

In order to prevent such deception, there are proposed methods described in Japanese unexamined patent publication Nos. 5-323990, 9-127974 and 2001-109494.

According to the publication No. 5-323990, a phoneme/syllable model is created and registered for each talker. Then, a talker is requested to utter a different phrase each time and user authentication is performed based on the feature quantity of phoneme/syllable.

According to the publication No. 9-127974, in a speaker recognition method for confirming a speaker, when the voice of a speaker is inputted, predetermined sound is inputted along with the voice. Then, the predetermined sound component is removed from the inputted signal and speaker recognition is performed by use of the resultant signal.

According to the publication No. 2001-109494, it is identified whether input voice is reproduced voice or not based on the difference of phase information between real voice and reproduced voice obtained by recording and reproducing the real voice.

The methods described in the publications mentioned above, however, involve complicated processing, leading to the high cost of hardware and software used for voice authentication.

If "identity theft/impersonation" in which surreptitiously recorded voice is reproduced to attempt to obtain authentication can be prevented in a simpler way, voice authentication technology will be used without anxiety.

SUMMARY OF THE INVENTION

The present invention is directed to solve the problems pointed out above, and therefore, an object of the present invention is to detect "identity theft/impersonation" in which voice reproduced by a reproducer is used to attempt to obtain authentication more easily than conventional methods.

According to one aspect of the present invention, a user authentication system for performing user authentication using voice authentication technology includes a sound pick-up portion for picking up ambient sound during a period of time before a person who is to be subject to the user authentication utters, the ambient sound being sound around the person, an intensity level calculation portion for calculating an intensity level showing intensity of the picked up ambient sound per predetermined time for each of sections into which the period of time is divided, a reproduced sound presence determination portion for determining that the picked up ambient sound includes reproduced sound that is sound reproduced by a reproducer when, of two of the calculated intensity levels, the intensity level of the later section is larger than a sum of the intensity level of the earlier section and a predetermined value, and a fraudulent user determination portion for determining that the person is a fraudulent user when it is detected that the reproduced sound is included.

The present invention makes it possible to detect "identity theft/impersonation" in which voice reproduced by a reproducer is used to attempt to obtain authentication more easily than conventional methods.

These and other characteristics and objects of the present invention will become more apparent by the following descriptions of preferred embodiments with reference to drawings.

DESCRIPTION OF THE PREFERRED EMBODIMENTS

Figure 1:
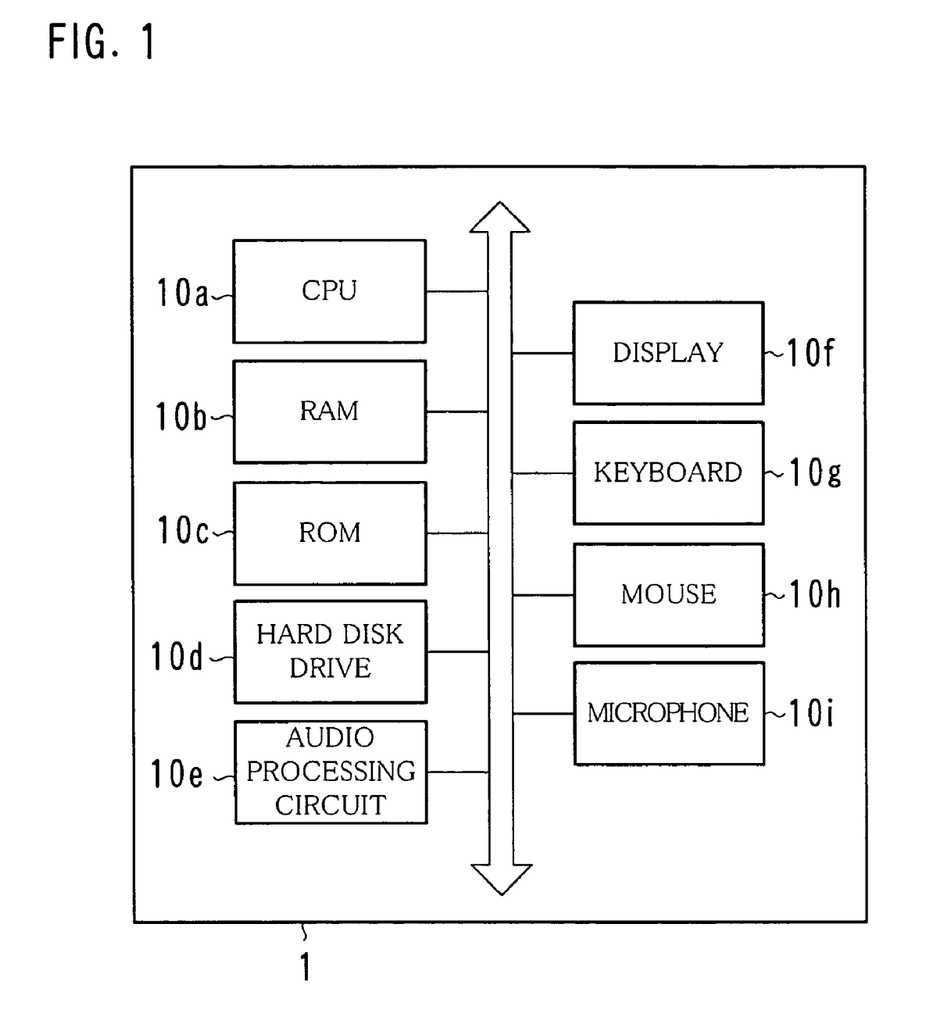
FIG. 1 is a diagram showing an example of a hardware configuration of a personal computer.
Figure 2:
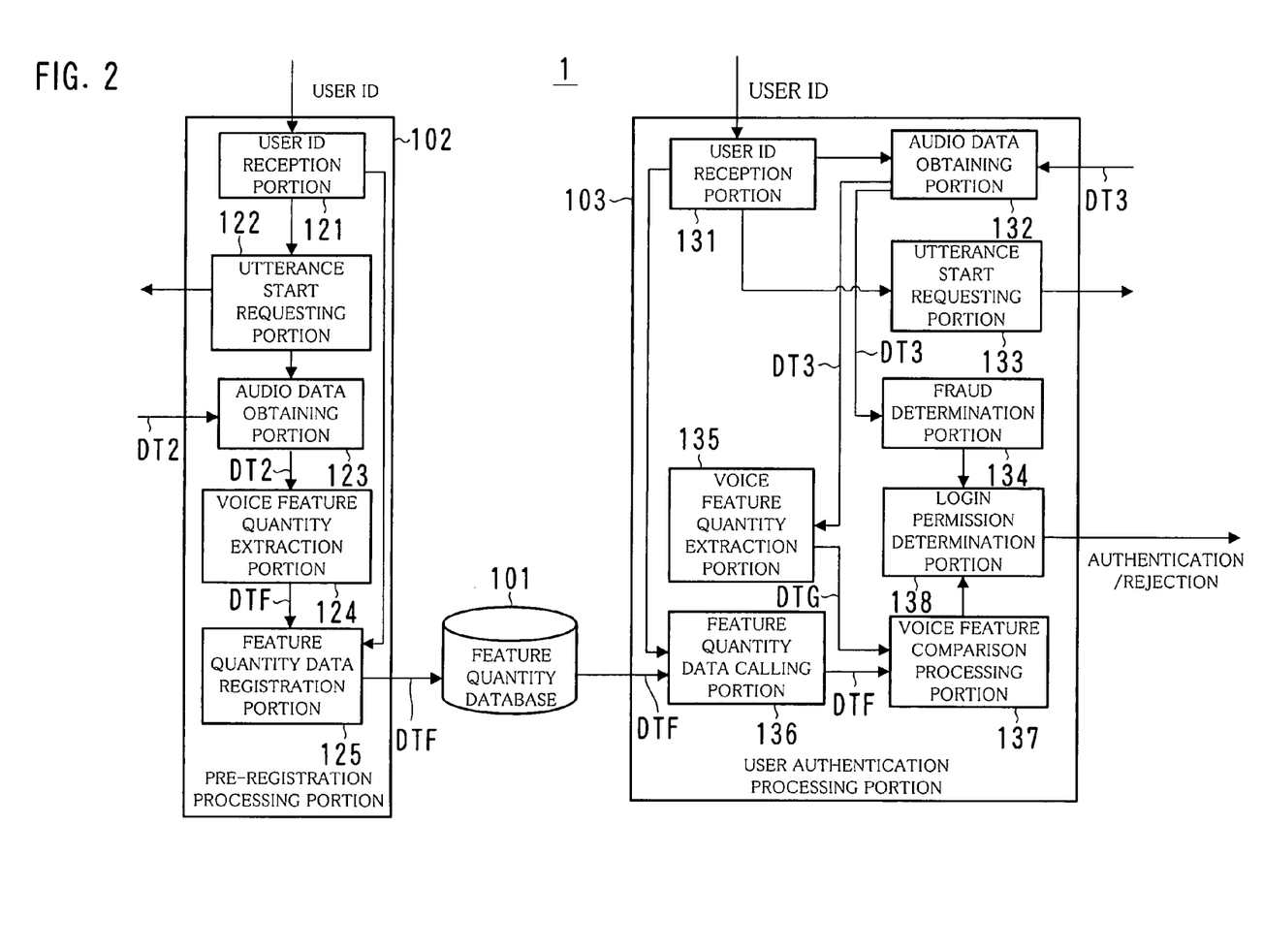
FIG. 2 is a diagram showing an example of a functional configuration of the personal computer.

FIG. 1 is a diagram showing an example of a hardware configuration of a personal computer 1 and FIG. 2 is a diagram showing an example of a functional configuration of the personal computer 1.

As shown in FIG. 1, the personal computer 1 is a device to which voice authentication technology and fraudulent user determination technology according to the present invention are applied. The personal computer 1 includes a CPU 10a, a RAM 10b, a ROM 10c, a hard disk drive 10d, an audio processing circuit 10e, a display 10f, a keyboard 10g, a mouse 10h and a microphone 10i.

The personal computer 1 is installed in corporate or government offices and is shared by plural users. When a user, however, uses the personal computer 1, he/she is required to use his/her own user account to login to the personal computer 1 for the purpose of security protection. The personal computer 1 performs user authentication using the voice authentication technology in order to determine whether the user is allowed to login thereto.

On the hard disk drive 10d is installed user authentication application for performing user authentication of users through the use of voice authentication technology. Referring to FIG. 2, the user authentication application is made up of modules and data for achieving functions including a feature quantity database 101, a pre-registration processing portion 102, and a user authentication processing portion 103. The modules and data included in the user authentication application are loaded onto the RAM 10b as needed, so that the modules are executed by the CPU 10a. The following is a description of a case of using text-dependent voice authentication technology.

The display 10f operates to display request messages for users. The keyboard 10g and the mouse 10h are input devices for users to enter commands or their own user IDs.

The microphone 10i is used to pick up voice of a user who is a target of user authentication. Along with the voice, ambient noise is also picked up. The sound picked up with the microphone 10i is sampled by the audio processing circuit 10e to be converted into electronic data.

Figure 3:
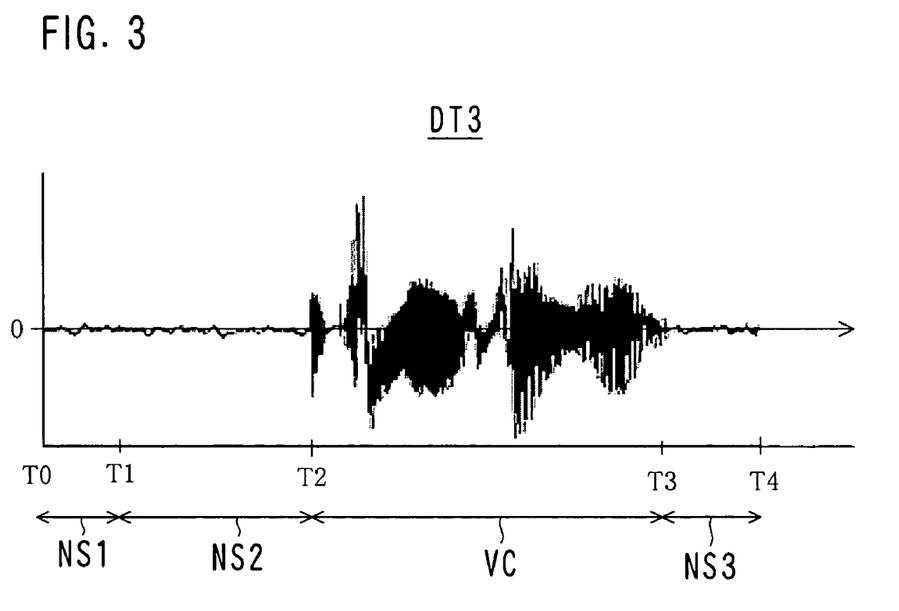
FIG. 3 is a graph showing an example of changes in sound pressure of audio of audio data in the case of real voice.
Figure 4:
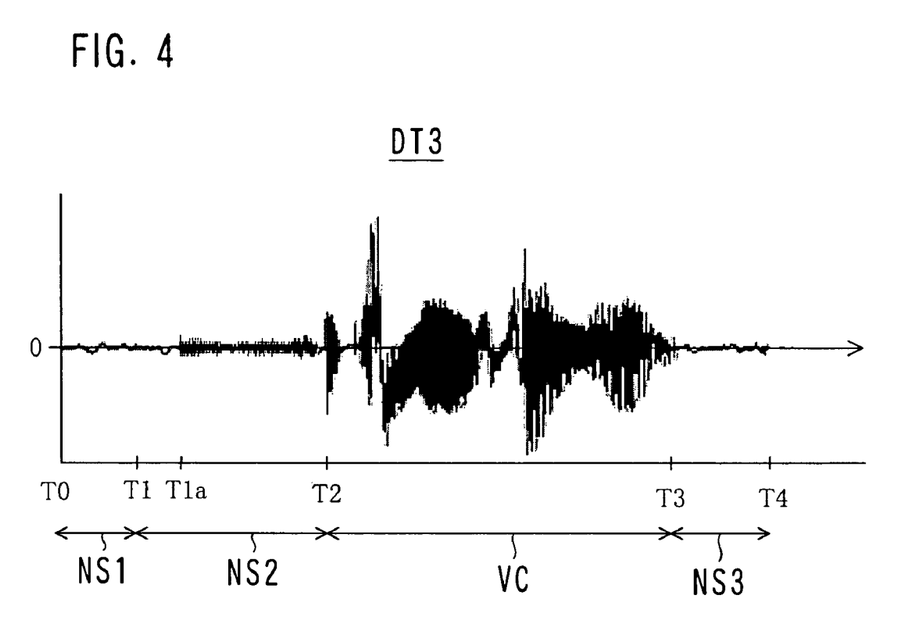
FIG. 4 is a graph showing an example of changes in sound pressure of audio of audio data in the case where reproduced sound is included.
Figure 5:
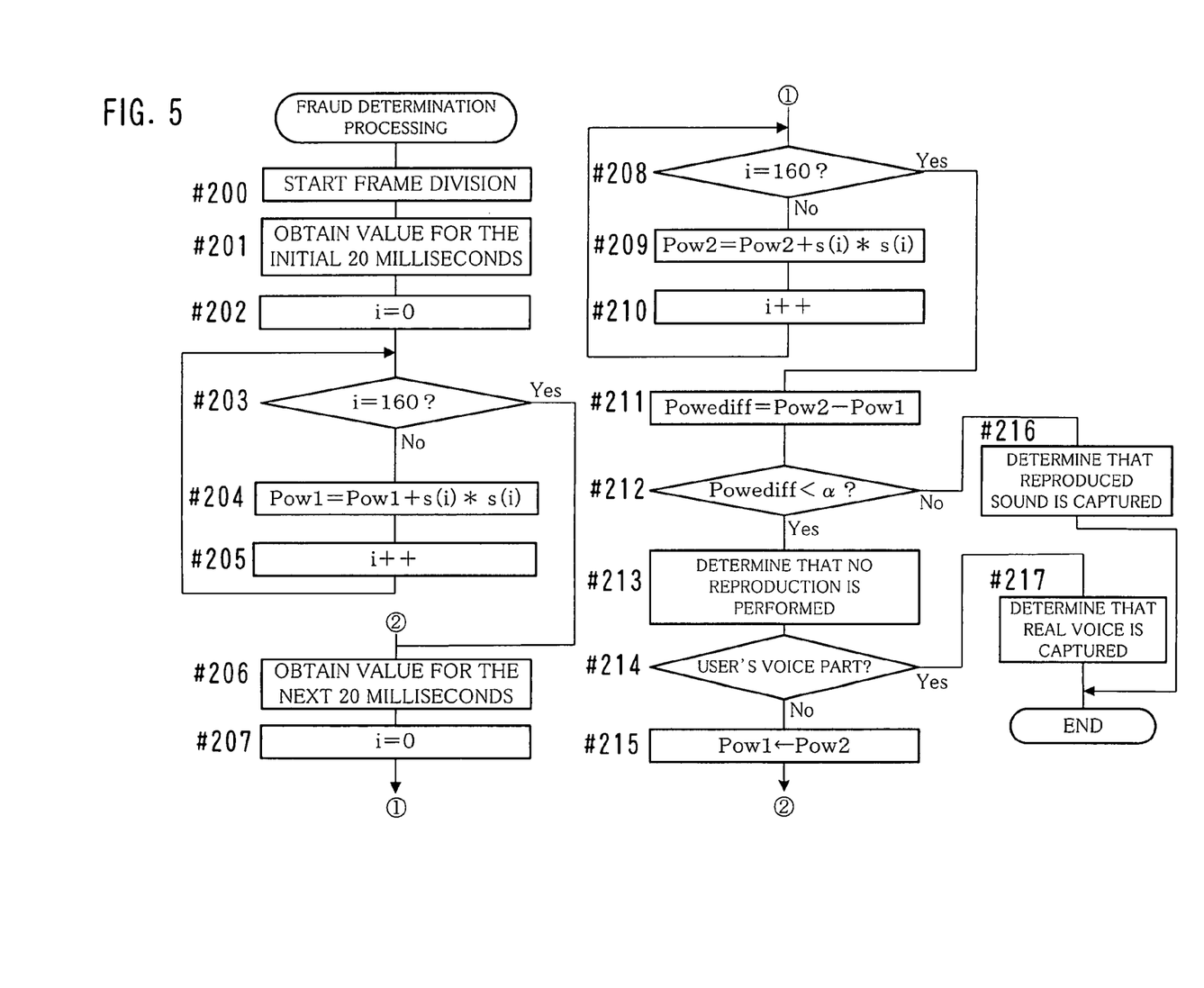
FIG. 5 is a flowchart for explaining a flow example of fraud determination processing.
Figure 6:
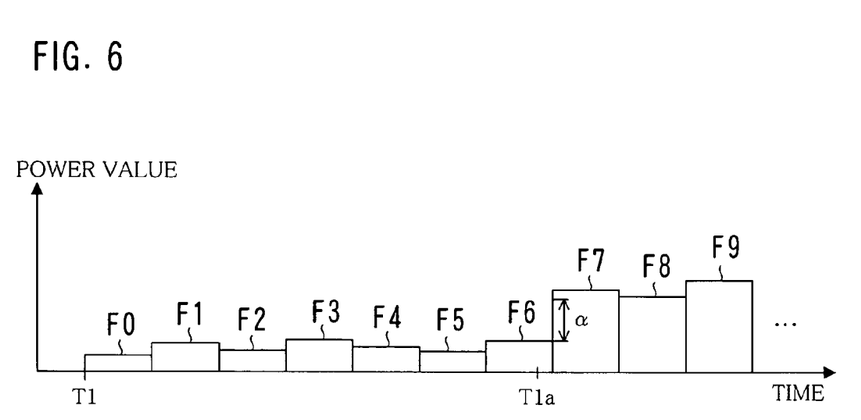
FIG. 6 is a graph showing an example of changes in power value for each unit time.

FIG. 3 is a graph showing an example of changes in sound pressure of audio of audio data DT3 in the case of real voice. FIG. 4 is a graph showing an example of changes in sound pressure of audio of the audio data DT3 in the case where reproduced sound is included. FIG. 5 is a flowchart for explaining a flow example of fraud determination processing. FIG. 6 is a graph showing an example of changes in power value for each unit time.

Next, a detailed description is provided of processing contents of each portion included in the personal computer 1 shown in FIG. 2. The feature quantity database 101 stores and manages voice feature quantity data DTF for each user. The voice feature quantity data DTF are data showing feature quantity of user's voice and is associated with identification information of a user account of the user, i.e., a user ID. Since the voice feature quantity data DTF are used in the case of performing user authentication, it is necessary for users needing to use the personal computer 1 to register, in advance, voice feature quantity data DTF for themselves in the feature quantity database 101.

The pre-registration processing portion 102 includes a user ID reception portion 121, an utterance start requesting portion 122, an audio data obtaining portion 123, a voice feature quantity extraction portion 124 and a feature quantity data registration portion 125. The pre-registration processing portion 102 performs processing for registering voice feature quantity data DTF for users in the feature quantity database 101.

The user ID reception portion 121 performs processing for receiving a user ID of a user who desires to register voice feature quantity data DTF, for example, in the following manner. When the user operates the keyboard 10g or the mouse 10h to enter a predetermined command, the user ID reception portion 121 makes the display 10f display a message requesting the user to enter a user ID of the user. Responding to this, the user enters his/her user ID. Then, the user ID reception portion 121 detects the user ID thus entered to accept the same.

After the user ID reception portion 121 accepts the user ID, the utterance start requesting portion 122 makes the display 10f display a message requesting the user to utter a predetermined phrase, i.e., a keyword, for the microphone 10i. Responding to this, the user utters the keyword in his/her real voice.

The audio data obtaining portion 123 controls the microphone 10i to pick up the voice uttered by the user and controls the audio processing circuit 10e to convert the voice thus picked up into electronic data. In this way, audio data DT2 for the user are obtained.

The voice feature quantity extraction portion 124 analyzes the audio data DT2 obtained by the audio data obtaining portion 123 to extract feature quantity of the voice, so that the voice feature quantity data DTF are generated.

The feature quantity data registration portion 125 registers the voice feature quantity data DTF obtained by the voice feature quantity extraction portion 124 in the feature quantity database 101 in association with the user ID accepted by the user ID reception portion 121.

The user authentication processing portion 103 includes a user ID reception portion 131, an audio data obtaining portion 132, an utterance start requesting portion 133, a fraud determination portion 134, a voice feature quantity extraction portion 135, a feature quantity data calling portion 136, a voice feature comparison processing portion 137 and a login permission determination portion 138. The user authentication processing portion 103 performs user authentication of a user who attempts to login (hereinafter referred to as a "login requesting user").

The user ID reception portion 131 performs processing for receiving a user ID of the login requesting user, for example, in the following manner. When the login requesting user operates the keyboard 10g or the mouse 10h to enter a predetermined command, the user ID reception portion 131 makes the display 10f display a message requesting the login requesting user to enter a user ID of the login requesting user. Responding to this, the login requesting user enters his/her user ID. Then, the user ID reception portion 131 detects the user ID thus entered to accept the same.

Immediately after the user ID reception portion 131 receives the user ID, the audio data obtaining portion 132 controls the microphone 10i to start picking up sound around the login requesting user and controls the audio processing circuit 10e to convert the sound thus picked up into electronic data. Further, the audio data obtaining portion 132 continues to pick up sound to generate audio data DT3 until the user authentication of the login requesting user is completed.

After the user ID is accepted, the utterance start requesting portion 133 makes the display 10f display a message requesting the login requesting user to utter a keyword for the microphone 10i. When reading the message, the login requesting user utters the keyword in his/her real voice.

The fraud determination portion 134 performs processing for determining whether or not the login requesting user is a fake person impersonating an authorized user by reproducing recorded voice. This processing is described later.

The voice feature quantity extraction portion 135 analyzes, among the audio data DT3 obtained by the audio data obtaining portion 132, data of a part (section) of the voice uttered by the login requesting user to extract feature quantity of the voice, so that voice feature quantity data DTG are generated. Since the method of detecting a voice part to distinguish between a voice part and a voiceless part (a voice-free part) is known, the description thereof is omitted.

The feature quantity data calling portion 136 calls voice feature quantity data DTF corresponding to the user ID received by the user ID reception portion 131 from the feature quantity database 101.

The voice feature comparison processing portion 137 compares voice feature quantity indicated in the voice feature quantity data DTG obtained by the voice feature quantity extraction portion 135 with voice feature quantity indicated in the voice feature quantity data DTF, then to determine whether or not voice uttered by the login requesting user is voice of the person who is the owner of the user ID accepted by the user ID reception portion 131. In short, the voice feature comparison processing portion 137 performs user authentication using the voice authentication technology.

After the voice feature comparison processing portion 137 completes the processing, the audio data obtaining portion 132 controls the microphone 101 and the audio processing circuit 10e to finish the processing of picking up sound and the processing of converting the sound into electronic data, respectively.

Meanwhile, when the sound pick-up is continued as described above, audio data DT3 of audio having sound pressure of a waveform as shown in FIG. 3 are obtained. Only background sound (ambient sound) of the login requesting user, i.e., noise is picked up during the period from "user ID reception time T0" to "utterance request time T1". The time T0 is the time point when the user ID entered by the login requesting user is accepted. The time T1 is the time point when the message requesting the keyword utterance is displayed. The sound picked up during this period of time is referred to as a "first background noise portion NS1" below.

Only noise is continuously picked up also during the period from the utterance request time T1 to "utterance start time T2". The time T2 is the time point when the login requesting user starts uttering. The sound picked up during this period of time is refereed to as a "second background noise portion NS2" below.

The voice of the login requesting user is picked up during the period from the utterance start time T2 to "utterance finish time T3". The time T3 is the time point when the login requesting user finishes uttering. During this time period, noise is also picked up together with the voice of the login requesting user. Under a normal environment where sound recognition is possible, the noise level is much lower than the voice level. The sound picked up during this period of time is referred to as a "user audio portion VC" below.

Only noise is picked up again during the period from the utterance finish time T3 to "sound pick-up finish time T4".

The Time T4 is the time point when the sound pick-up is finished. The sound picked up during this period of time is referred to as a "third background noise portion NS3" below.

When the login requesting user utters in his/her real voice, audio having sound pressure of a waveform as shown in FIG. 3 is obtained. If a login operation is attempted by reproducing voice with a reproducer such as a cassette player or an IC player, audio having sound pressure of a waveform as shown in FIG. 4 is obtained. In the case of real voice, the waveform amplitude in the second background noise portion NS2 is substantially constant during the time period from the utterance request time T1 to the utterance start time T2. In contrast, in the case of reproduced sound, the waveform amplitude in the second background noise portion NS2 is substantially the same as the amplitude for the real voice case during the time from the utterance request time T1 to "reproduction start time T1a". The time T1a is the time point immediately before starting the reproduction operation with the reproducer. The waveform amplitude in the second background noise portion NS2, however, increases immediately after the reproduction start time T1a and the amplitude is maintained substantially constant by the utterance start time T2. Such changes in the waveform amplitude in the case of reproduced sound are due to the following reasons.

After the message is displayed (after the utterance start time T2), the login requesting user attempts to reproduce voice by pressing a reproduction button of the reproducer. Then, the reproducer starts reproduction from a voiceless part, and after a few moments, reproduces a voice part. The voiceless part includes noise around a recorder at the time of recording, i.e., background noise of the voice's owner.

Accordingly, the microphone 10i picks up also noise reproduced by the reproducer together with background noise of the login requesting user during the period of time from when the reproduction button is pressed and reproduction starts until the reproduction reaches the voice part, i.e., from the reproduction start time T1a to the utterance start time T2. Consequently, during the period of time, sound pressure of sound picked up by the microphone 10i becomes high and the waveform amplitude becomes large by amount corresponding to sound pressure of reproduced noise, as shown in FIG. 4.

Referring back to FIG. 2, the fraud determination portion 134 performs processing for determining whether or not the login requesting user is a fake person in the procedure shown in the flowchart of FIG. 5. In the case of the determination processing, the fraud determination portion 134 uses the above-described rule that, during the time period from the utterance request time T1 to the utterance start time T2, the waveform amplitude is substantially constant for the real voice case, and the amplitude becomes large by a predetermined value or more during the reproduction for the reproduced voice case.

After displaying the message requesting the keyword utterance (at or after the utterance request time T1), a waveform of sound picked up by the microphone 101 is divided equally from the leading edge of the waveform at predetermined intervals (#200 in FIG. 5). Hereinafter, the sections obtained by the division are referred to as "frames". In addition, the frames are sometimes described like, in order from the beginning, "frame F0", "frame F1", "frame F2", . . . in order to distinguish one from another. In the present embodiment, a case is described by way of example in which the predetermined interval is "20 ms" and the sampling frequency by the audio processing circuit 10e is 8 kHz.

Since the sound picked up by the microphone 10i is sampled by the audio processing circuit 10e, the personal computer 1 handles the sound as data of sound pressure values whose number corresponds to the sampling frequency. In the present embodiment, one hundred and sixty sound pressure values are arranged in one frame at intervals of 0.125 ms.

Predetermined mathematical formulas are used to calculate a value showing a degree of sound intensity in the first frame (frame F0) (#201-#205). Hereinafter, a value showing a level of sound intensity in a frame is referred to as a "power value". In the present invention, the power value shall be calculated by determining a sum of squares of the one hundred and sixty sound pressure values included in the frame. Accordingly, power values are determined by calculating sums of squares of the sound pressure values one after another and adding up the sums of squares. It can be said that the power value shows sound intensity per unit time (here, 20 ms) because the frames have the same length. The power value thus calculated is stored in a power value variable Pow1.

After calculating the power value in the frame F0 (Yes in #203), a power value in the next frame, i.e., in the frame F1 is calculated (#206-#210). The power value calculated in these steps is stored in a power value variable Pow2.

The difference between the power value variable Pow1 and the power value variable Pow2 is calculated. When the difference therebetween is lower than a threshold value a (#212), it is determined that reproduction by the reproducer is not performed in periods of time of both the neighboring frames (#213). Until voice is detected (until the utterance start time T2), the current value in the power value variable Pow2 is substituted into the power value variable Pow1 (#215), a power value in further next frame is calculated and the calculated value is substituted into the power value variable Pow2 (#206-#210) and comparison of the power values between both the neighboring frames is serially performed (#212, #212). In short, as shown in FIG. 6, comparison of power values between the frame F1 and the frame F2, the frame F2 and the frame F3, the frame F3 and the frame F4, and . . . is serially performed.

During executing the comparison processing as described above, when the change is found, that a power value increases by the threshold value α or more such as the change from a power value in the frame F6 to a power value in the frame F7 as shown in FIG. 6 (No in #212), it is determined that reproduced sound with a reproducer is picked up and a fraudulent login operation is about to be performed by a fraud (identity theft/impersonation) (#216). In contrast, when the change is found that a power value increases by the threshold value α or more at the utterance start time T2 (Yes in #214), it is determined that no reproduced sound is detected and a login operation is about to be performed using real voice (#217).

Note that the processing shown in FIG. 5 may be started before the utterance request time T1. The processing may be started, for example, from the user ID reception time T0.

Referring back to FIG. 2, when the voice feature comparison processing portion 137 determines that the voice uttered by the login requesting user is voice of the owner of the user ID and the fraud determination portion 134 determines that the login requesting user is not a fake person, the login permission determination portion 138 allows the login requesting user to login to the personal computer 1. Stated differently, the login permission determination portion 138 verifies that the login requesting user is an authorized user. The verification enables the login requesting user to use the personal computer 1 until he/she logs out thereof. In contrast, in the case where the voice of the login requesting user cannot be determined to be voice of the owner of the user ID, or in the case where a fraud is found, the login permission determination portion 138 rejects the login of the login requesting user.

Figure 7:
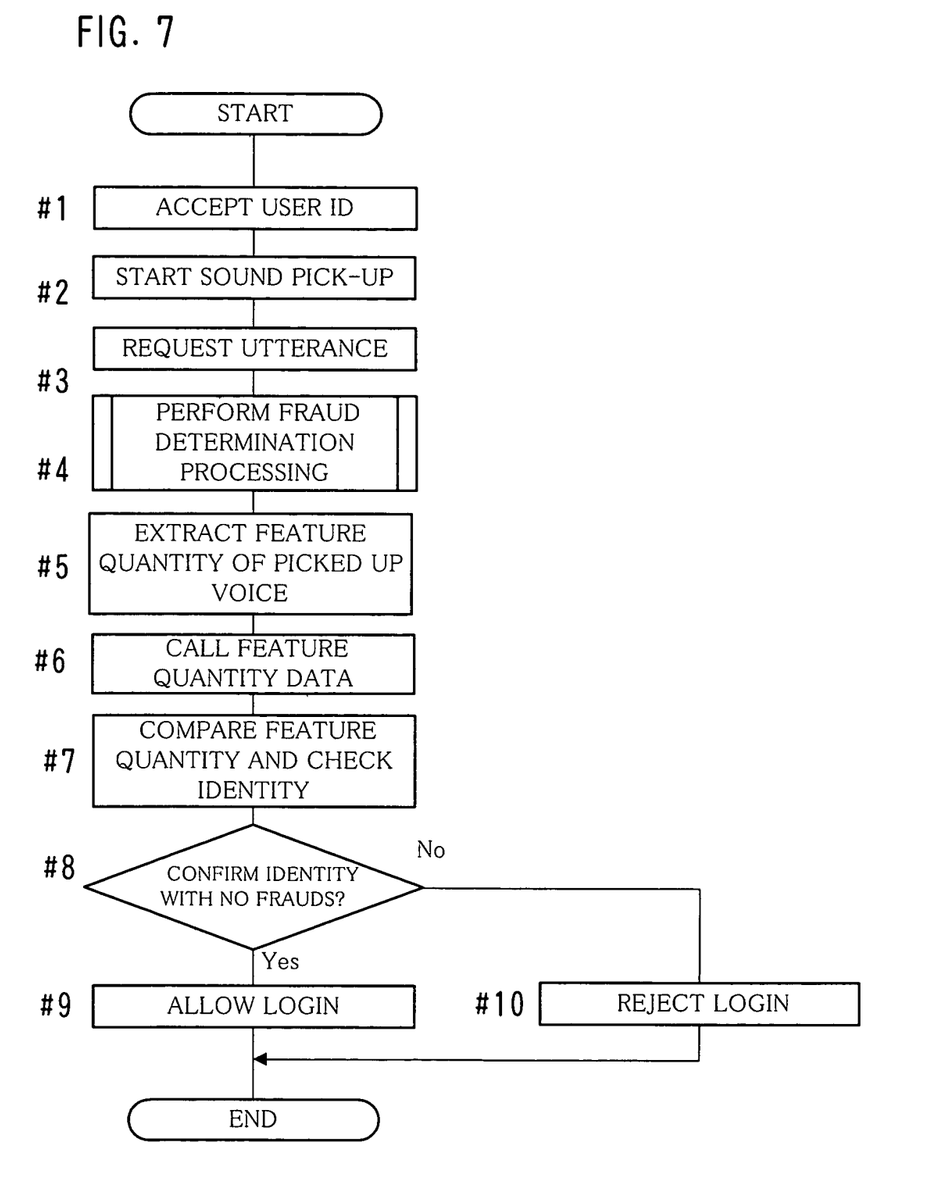
FIG. 7 is a flowchart for explaining an example of the entire process flow in a personal computer.

FIG. 7 is a flowchart for explaining an example of the entire process flow in the personal computer 1.

Next, a description is provided, with reference to the flowchart, of the processing flow of authentication of a login requesting user in the personal computer 1.

Referring to FIG. 7, when accepting a user ID entered by the login requesting user (#1), the personal computer 1 starts sound pick-up with the microphone 10i (#2) and requests the login requesting user to utter a keyword (#3).

The fraud determination processing is started in order to monitor frauds using a reproducer (#4). The fraud determination processing is as described earlier with reference to FIG. 5.

When voice is detected, feature quantity of the voice is extracted to obtain voice feature quantity data DTG (#5). In addition, voice feature quantity data DTF corresponding to the accepted user ID are called at any point in time of Steps #1-#5 (#6). It is determined whether or not the login requesting user is a person as the owner of the user ID based on the voice feature quantity data DTF and the voice feature quantity data DTG (#7). Note that the processing of Step #4 and the processing of Steps #5-#7 may be performed in parallel with each other.

Then, when no fraud with the reproducer is found and it can be confirmed that the login requesting user is the person as the owner of the user ID (Yes in #8), the login requesting user is allowed to login to the personal computer 1 (#9). When a fraud is found or it cannot be confirmed that the login requesting user is the person as the owner of the user ID (No in #8), the login of the login requesting user is rejected (#10).

When a fraud is found, it is possible to reject the login without waiting for the processing result in Step #7.

The present embodiment can easily determine "identity theft/impersonation" in which voice reproduced by a reproducer is used to attempt to obtain authentication merely by checking a background noise level.

In the present embodiment, a fake person who uses reproduced sound with a reproducer is determined by comparing sums of squares of sound pressure values between two neighboring frames. Instead, however, such a fake person can be determined by other methods.

For example, a power value in the frame F0 is defined as the reference value. Then, comparison is made between the reference value and each of power values in the frames F1, F2, F3 . . . . Then, if the difference equal to or more than a threshold value α is detected even once, it may be determined that a login requesting user is a fake person. Alternatively, if such a difference is detected a predetermined number of times or more, e.g., five times or the number of times corresponding to predetermined proportion to the number of times of all the comparison processes, it may be determined that a login requesting user is a fake person.

It is possible to use, instead of the sum of squares, the average value of sound intensity in a frame, i.e., a decibel value, as a power value. Alternatively, it is possible to use, as a power value, the sum of the absolute values of sound pressure values in a frame.

As described earlier with reference to FIG. 4, there is a rule that during the period of time from when a reproducer starts reproduction until a voice is detected, i.e., from the reproduction start time T1a to the utterance start time T2, a sound pressure level continues to be higher than a sound pressure level before reproduction by a level within a certain range. In order to prevent error detection of reproduced sound, the following determination method is possible. More specifically, after detecting reproduced sound in Step #216 in FIG. 5, the comparison process between frames is continued for a short period of time, e.g., during a period approximately from a few tenths of a second to two seconds. Then, it is checked whether or not a state continues where a sound pressure level is higher than a sound pressure level before reproduction by a level within a certain range. If such a state continues without going back to the sound pressure level before reproduction, it may be determined to be a fraud using a reproducer.

Further, another determination method is possible. More specifically, comparison is made between the average value of sound pressure levels (decibel values) in the first background noise portion NS1 and the average value of sound pressure levels in the second background noise portion NS2. If the latter is larger than the former by predetermined amount or more, it may be determined to be a fraud.

In the present embodiment, a request for entry of a user ID is performed separately from a request for utterance of a keyword. Instead, however, both the requests may be performed simultaneously by displaying a message such as "Please enter your user ID and subsequently utter a keyword". Alternatively, another method is possible in which a user is requested to utter a keyword and subsequently to enter his/her user ID after the sound of the keyword is picked up.

In the present embodiment, the description is provided of the case of performing user authentication of a user who attempts to login to the personal computer 1. The present invention is also applicable to the case of performing authentication in other devices. The present invention can apply also, for example, to ATMs (Automatic Teller Machine) or CDs (Cash Dispenser) for banks or credit card companies, entrance control devices for security rooms or user authentication for cellular phones.

[Change of Setting of Threshold Value $\alpha$]

Figure 8:
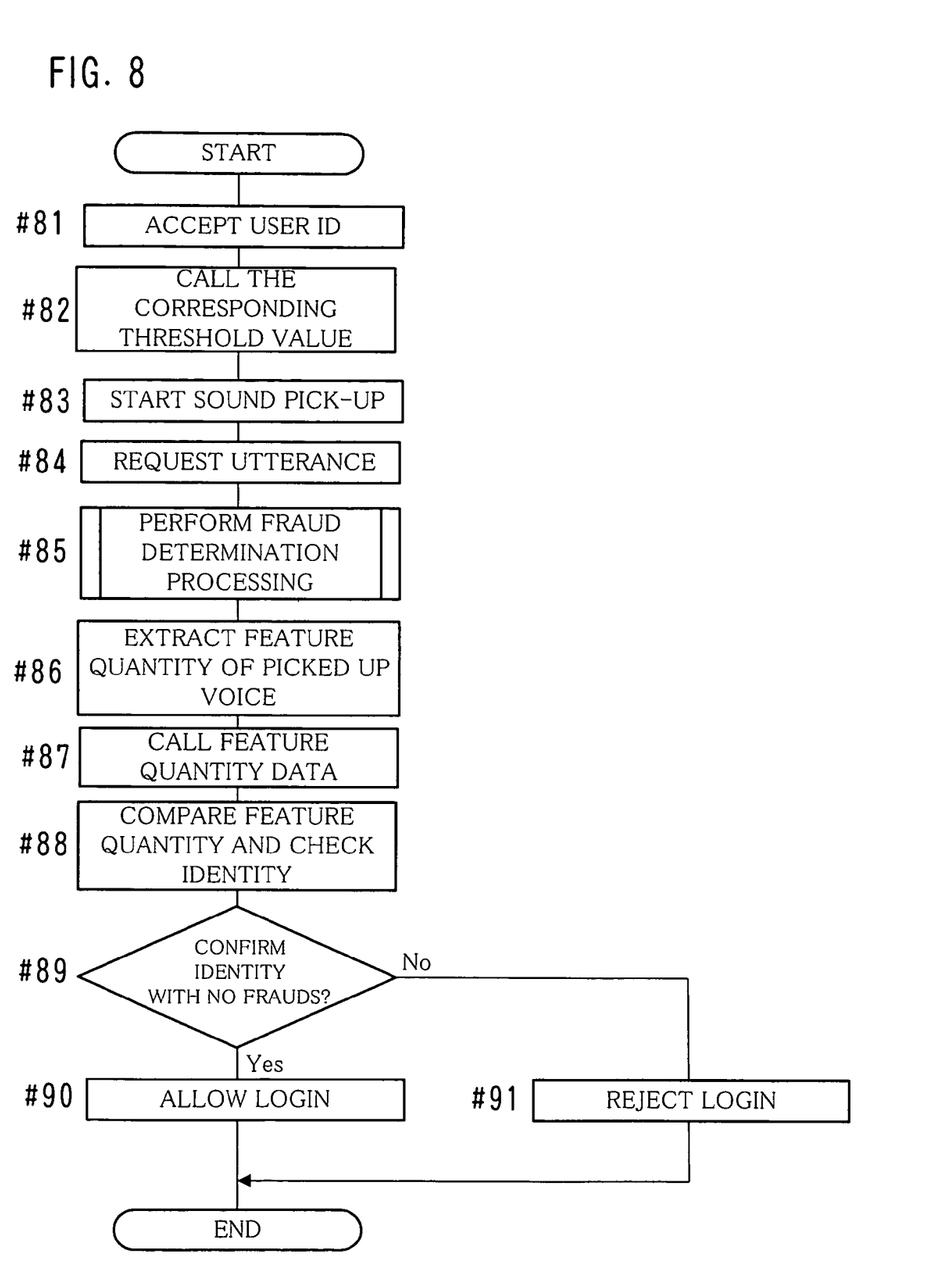
FIG. 8 is a flowchart for explaining a modified example of the entire process flow in a personal computer.

FIG. 8 is a flowchart for explaining a modified example of the entire process flow in the personal computer 1.

If a value of a threshold value $\alpha$ is not set appropriately, a case may arise in which a fraud using a reproducer is not detected properly or a fraud is detected erroneously regardless of no frauds. It is necessary to determine which value should be set as the threshold value $\alpha$ in accordance with circumstances surrounding a user or a security policy.

The threshold value $\alpha$ may be controlled by the following configuration. An environment where 40 dB sound is steadily heard is defined as the reference environment. The microphone 10$i$ is used to pick up sound under the reference environment and the average value of power values per one frame is calculated. Then, the average value thus calculated is set to the reference value P0 of the threshold value $\alpha$. The default value of the threshold value $\alpha$ is set to the reference value P0.

If a user authentication processing device, e.g., the personal computer 1 in the embodiment described above, is used under a noisy environment compared to the reference environment, the threshold value $\alpha$ is set to a value larger than the reference value P0 again. In addition, the threshold value $\alpha$ is set to a larger value as the degree of noise increases. In contrast, if the user authentication processing device is used under a quiet environment compared to the reference environment, the threshold value $\alpha$ is set to a value smaller than the reference value P0 again. In addition, the threshold value $\alpha$ is set to a smaller value as the degree of noise decreases.

Further, under an environment where high security is required, the threshold value $\alpha$ is set to a value smaller than the reference value P0 again. Such a resetting operation is preferable in the case of authentication in ATMs for banks or personal computers storing confidential information.

It is possible for an administrator to change the setting of the threshold value $\alpha$ by performing a predetermined operation. Alternatively, the setting of the threshold value $\alpha$ may be changed automatically in cooperation with a camera, a sensor or a clock.

For example, in the case of ATMs for banks located along arterial roads, the number of vehicles and people passing therethrough changes depending on time of day. With the change in the number of vehicles and people, the surrounding noise level also changes. Under such a circumstance, a configuration is possible in which, in cooperation with a clock, the threshold value $\alpha$ is automatically increased during busy traffic periods and the threshold value $\alpha$ is automatically decreased during light traffic periods. Another configuration is possible in which a camera or a sensor is used to count the number of vehicles or people passing through the arterial road to automatically adjust the threshold value $\alpha$ in accordance with the number of counts during a predetermined period of time, e.g., for one hour.

In the case where a user uses a telephone on a normal line or a cellular phone to request authentication from a remote location via a communication line, the threshold value $\alpha$ may be set again depending on characteristics of the communication line. Alternatively, a threshold value $\alpha$ may be determined in advance for each user and the threshold values $\alpha$ may be stored in a database in association with user IDs of the respective users, so that the threshold value $\alpha$ suitable for an environment for each user is selected. Then, a user authentication process may be performed in the procedure shown in the flowchart of FIG. 8.

When accepting a user ID of a user who is in a remote location (#81), a user authentication processing device such as the personal computer 1 or an ATM calls a threshold value $\alpha$ corresponding to the user ID from a database (#82). A communication interface device such as a modem or an NIC receives audio data transmitted from a telephone or a cellular phone of the user via a communication line (#83) instead of sound pick-up with the microphone 10$i$. The user authentication processing device requests the user to utter a keyword (#84). The subsequent processing flow is as described earlier with reference to Steps #4-#10 in FIG. 7.

In the embodiments described above, the configuration of the entire or a part of the personal computer 1, the processing contents and the processing order thereof and the configuration of the database can be modified in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A user authentication system for performing user authentication using voice authentication technology, the user authentication being performed during a first period before a user utters and a second period in which the user utters, the system comprising:

a sound pick-up portion for picking up ambient sound around the user during the first period and the second period;

an intensity level calculation portion for calculating an intensity level of the ambient sound picked up during the first period for each of a plurality of sections into which the first period is divided; and a fraudulent user determination portion that defines one of the plurality of sections of the first period as a reference section, selects a section in the first period sequentially starting from a section temporally subsequent to the reference section, compares the selected section with the reference section, determines that the user is a fraudulent user who attempts to obtain authentication by reproducing voice with a reproducer if the intensity level for the selected section is larger than the intensity level for the reference section and, at the same time, a difference between the intensity levels for the selected section and the reference section is equal to or larger than a predetermined value.

2. The user authentication system according to claim 1, further comprising
an environmental information obtaining portion for obtaining environmental information on an environment of a place where the ambient sound is picked up, and
a predetermined value changing portion for changing the predetermined value depending on contents of the environmental information.

3. The user authentication system according to claim 1, wherein the intensity level of the picked up ambient sound for each of the plurality of sections is expressed by a sum of squares of a predetermined number of values that are obtained by sampling the picked up ambient sound for said each of the plurality of sections the predetermined number of times.

4. A user authentication system for performing user authentication using voice authentication technology, the user authentication being performed during a first period before a user utters and a second period in which the user utters, the system comprising:
an utterance requesting portion for outputting a message requesting utterance to a person who is to be subject to the user authentication;
a sound pick-up portion for starting picking up ambient sound that is sound around the person at the latest before the message is outputted and picking up the ambient sound thereafter in the first period and the second period;
an intensity level calculation portion for calculating an intensity level of the ambient sound picked up during the first period for each of a plurality of sections into which the first period is divided; and
a fraudulent user determination portion that defines one of the plurality of sections of the first period as a reference section, selects a section in the first period sequentially starting from a section temporally subsequent to the reference section, compares the selected section with the reference section, determines that the user is a fraudulent user who attempts to obtain authentication by reproducing voice with a reproducer if the intensity level for the selected section is larger than the intensity level for the reference section and, at the same time, a difference between the intensity levels for the selected section and the reference section is equal to or larger than a predetermined value.

5. A fraudulent user determination method for determining whether or not a user who attempts to be subject to user authentication using voice authentication technology is a fraudulent user, the user authentication being performed during a first period before the user utters and a second period in which the user utters, the method comprising:
picking up, using a sound pick-up device, ambient sound around the user during a the first period and the second period;
calculating, using a computer, an intensity level of the ambient sound picked up during the first period for each of a plurality of sections into which the first period is divided; and
defining one of the plurality of sections of the first period as a reference section, selecting a section in the first period sequentially starting from a section temporally subsequent to the reference section, comparing the selected section with the reference section, determining that the user is a fraudulent user who attempts to obtain authentication by reproducing voice with a reproducer if the intensity level for the selected section is larger than the intensity level for the reference section and, at the same time, a difference between the intensity levels for the selected section and the reference section is equal to or larger than a predetermined value.

6. A non-transitory computer-readable storage medium storing thereon a computer program for use in a computer that determines whether or not a person who attempts to be subject to user authentication using voice authentication technology is a fraudulent user, the user authentication being performed during a first period before the user utters and a second period in which the user utters, the computer program causing the computer to perform:
picking up, using a sound pick-up device, ambient sound around the user during a the first period and the second period;
calculating, using a computer, an intensity level showing intensity of the ambient sound picked up during the first period for each of a plurality of sections into which the first period is divided; and
section, selecting a section in the first period sequentially starting from a section temporally subsequent to the reference section, comparing the selected section with the reference section, determining that the user is a fraudulent user who attempts to obtain authentication by reproducing voice with a reproducer if the intensity level for the selected section is larger than the intensity level for the reference section and, at the same time, a difference between the intensity levels for the selected section and the reference section is equal to or larger than a predetermined value.

* * * * *